US011051332B2

(12) United States Patent
Wei

(10) Patent No.: US 11,051,332 B2
(45) Date of Patent: Jun. 29, 2021

(54) METHOD AND APPARATUS FOR LOGICAL CHANNEL SELECTION

(71) Applicant: FG Innovation Company Limited, Tuen Mun (HK)

(72) Inventor: Chia-Hung Wei, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 67 days.

(21) Appl. No.: 16/448,942

(22) Filed: Jun. 21, 2019

(65) Prior Publication Data

US 2019/0394796 A1 Dec. 26, 2019

Related U.S. Application Data

(60) Provisional application No. 62/688,187, filed on Jun. 21, 2018.

(51) Int. Cl.
*H04W 4/00* (2018.01)
*H04W 72/14* (2009.01)
(Continued)

(52) U.S. Cl.
CPC ........... *H04W 72/14* (2013.01); *H04W 28/04* (2013.01); *H04W 72/1284* (2013.01)

(58) Field of Classification Search
CPC .. H04W 72/14; H04W 72/1284; H04W 28/04
See application file for complete search history.

(56) References Cited

U.S. PATENT DOCUMENTS

2018/0324835 A1* 11/2018 Agiwal ............ H04W 72/0453
2018/0368133 A1* 12/2018 Park .................... H04W 72/048
(Continued)

FOREIGN PATENT DOCUMENTS

CN 102036390 A 4/2011
EP 3217587 A1 9/2017

OTHER PUBLICATIONS

Interdigital Inc. Logical Channel Selection in LCP «3GPP TSG-RAN WG2 #99bis R2-1710660» Oct. 9, 2017 (Oct. 9, 2017) the whole document.

(Continued)

*Primary Examiner* — Bo Hui A Zhu
(74) *Attorney, Agent, or Firm* — ScienBiziP, P.C.

(57) ABSTRACT

A user equipment (UE) is provided. The UE includes one or more non-transitory computer-readable media having computer-executable instructions embodied thereon and at least one processor coupled to the one or more non-transitory computer-readable media. The at least one processor is configured to execute the computer-executable instructions to perform following actions: Receive, from a base station, a block error rate (BLER) related restriction for each of a plurality of configured logical channels. Receive, from the base station, an uplink (UL) grant. Obtain a BLER related characteristic of the UL grant. Select, among the plurality of configured logical channels, one or more logical channels for the UL grant, according to the BLER related characteristic of the UL grant and the BLER related restriction for each of the plurality of configured logical channels when a first condition is met. Allocate the UL grant to the selected one or more logical channels.

28 Claims, 10 Drawing Sheets

(51) Int. Cl.
*H04W 28/04* (2009.01)
*H04W 72/12* (2009.01)

(56) References Cited

U.S. PATENT DOCUMENTS

2019/0215850 A1* 7/2019 Tang ................... H04W 72/14
2019/0394785 A1* 12/2019 He ....................... H04L 1/0002
2020/0214032 A1* 7/2020 Jiang ..................... H04L 5/00

OTHER PUBLICATIONS

ZTE Dicsussion on logical channel priorization «3GPP TSG RAN WG2 #69 R2-101099» Feb. 22, 2010 (Feb. 22, 2010) section 2, figure 4.

* cited by examiner

```
LogicalChannelConfig ::=          SEQUENCE {
    ul-SpecificParameters         SEQUENCE {
        priority                              INTEGER (1..16),
        prioritisedBitRate                    ENUMERATED {kBps0, kBps8, kBps16, ..., infinity},
        bucketSizeDuration                    ENUMERATED {ms50, ms100, ms150, ms300, ms500, ms1000, spare2, spare1},
        allowedServingCells                   SEQUENCE (SIZE (1..maxNrofServingCells-1)) OF ServCellIndex     OPTIONAL,
        allowedSCS-List                       SEQUENCE (SIZE (1..maxSCSs)) OF SubcarrierSpacing              OPTIONAL,
        maxPUSCH-Duration                     ENUMERATED { ms0p02, ms0p04, ms0p0625, ..., spare2, spare1 }    OPTIONAL,
        configuredGrantTypelAllowed           ENUMERATED {true}                                               OPTIONAL,
        logicalChannelGroup                   INTEGER (0..maxLCG-ID)                                          OPTIONAL,
        schedulingRequestID                   SchedulingRequestId                                             OPTIONAL,
        logicalChannelSR-Mask                 BOOLEAN,
        logicalChannelSR-DelayTimerApplied    BOOLEAN,
        logicalChannelSR-DelayTimerApplied    BOOLEAN,
        BLER_restriction
    }OPTIONAL,
```

FIG. 4

The MAC entity may, when a new transmission is performed:

1> select the logical channels for each UL grant that satisfy all the following conditions:

2> the set of allowed Subcarrier Spacing index values in *allowedSCS-List*, if configured, includes the Subcarrier Spacing index associated to the UL grant; and 2> *maxPUSCH-Duration*, if configured, is larger than or equal to the PUSCH transmission duration associated to the UL grant; and 2> *configuredGrantTypeIAllowed*, if configured, is set to TRUE in case the UL grant is a Configured Grant Type 1; and 2> *allowedServingCells*, if configured, includes the Cell information associated to the UL grant; and 2> *BLER_restriction*, if configured, satisfy a specific condition.

The MAC entity may, when a new transmission is performed:

1> select the logical channels for each UL grant that satisfy all the following conditions:

(...),

2> *Allowed_Highest_BLER*, if configured, is not lower than the BLER level of the UL grant.

The MAC entity may, when a new transmission is performed:

1> select the logical channels for each UL grant that satisfy all the following conditions:

(...),

2> *Allowed_Lowest_BLER*, if configured, is not higher than the BLER level of the UL grant.

The MAC entity may, when a new transmission is performed:

1> select the logical channels for each UL grant that satisfy all the following conditions:

(...),

2> the set of BLER values in *Allowed_BLER_List*, if configured, includes the BLER level of the UL grant.

The MAC entity may, when a new transmission is performed:

1> select the logical channels for each UL grant that satisfy all the following conditions:

(...),

2> the set of BLER level indexes in *Allowed_BLER_List*, if configured, includes the BLER level of the UL grant.

The MAC entity may, when a new transmission is performed:

1> select the logical channels for each UL grant that satisfy all the following conditions:

(...),

2> *Allowed_Specific_BLER*, if configured, matches the BLER level of the UL grant

The MAC entity may, when a new transmission is performed:

1> select the logical channels for each UL grant that satisfy all the following conditions:

(...),

2> the set of BLER values in *Prohibit_BLER_List*, if configured, does not include the BLER level of the UL grant.

FIG. 11

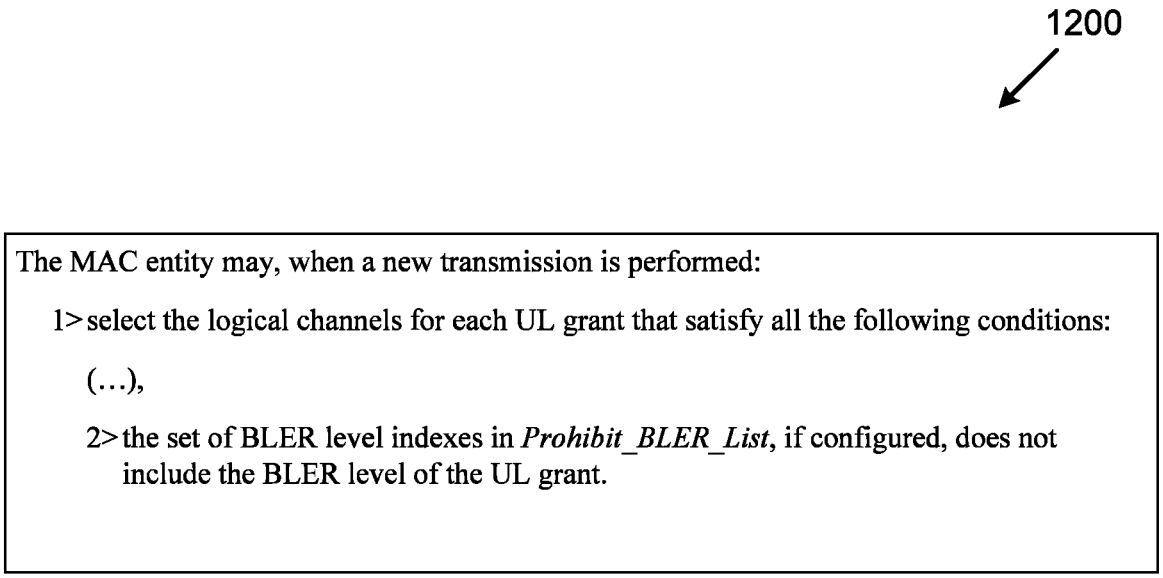

```
The MAC entity may, when a new transmission is performed:
  1> select the logical channels for each UL grant that satisfy all the following conditions:
    (...),
    2> the set of BLER level indexes in Prohibit_BLER_List, if configured, does not
       include the BLER level of the UL grant.
```

FIG. 12

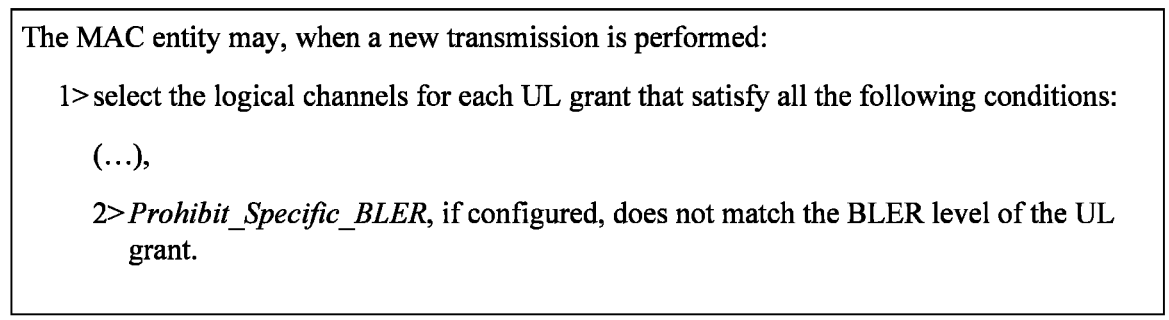

```
The MAC entity may, when a new transmission is performed:
  1> select the logical channels for each UL grant that satisfy all the following conditions:
    (...),
    2> Prohibit_Specific_BLER, if configured, does not match the BLER level of the UL
       grant.
```

The MAC entity may, when a new transmission is performed:

1> select the logical channels for each UL grant that satisfy all the following conditions:

(...),

2> the logical channel of the DRB which is configured with the PDCP duplication function,

The MAC entity may, when a new transmission is performed:

1> select the logical channels for each UL grant that satisfy all the following conditions:

(...),

2> the logical channel of the DRB which is configured with the PDCP duplication, and the PDCP duplication function is activated,

FIG. 15

METHOD AND APPARATUS FOR LOGICAL CHANNEL SELECTION

CROSS-REFERENCE TO RELATED APPLICATION(S)

The present application claims the benefit of and priority to a provisional U.S. Patent Application Ser. No. 62/688,187, filed on Jun. 21, 2018, entitled "Medium Access Control Procedures Supporting URLLC," (hereinafter referred to as "US74282 application"). The disclosure of the US74282 application is hereby incorporated fully by reference into the present application.

FIELD

The present disclosure generally relates to wireless communication, and more particularly, to the procedure of logical channel selection for the next generation wireless communication networks.

BACKGROUND

Various efforts have been made to improve different aspects of wireless communications, such as data rate, latency, reliability and mobility, for the next generation (e.g., 5G New Radio (NR)) wireless communication systems. On the purpose of supporting diverse use cases such as enhanced Mobile Broadband (eMBB), Ultra-reliable and Low Latency Communications (URLLC) and massive Machine Type Communication (mMTC), the radio frame structure and most of the medium access control (MAC) layer procedures in NR are designed to have high flexibility. In addition, NR also introduces a new type of radio resource which has a more robust characteristic (e.g., low block error rate (BLER)). The new type of radio resource aims to achieve a target BLER of $10^{-5}$.

One procedure in the MAC layer is logic channel prioritization (LCP), which is applied when a new transmission is performed. When a base station (e.g., eNB, ng-eNB, gNB) assigns uplink resources for a user equipment (UE) to transmit uplink data, the UE may perform the LCP procedure to allocate the uplink resource assignments to appropriate logical channels. The LCP procedure may include a procedure of logical channel selection to identify valid logical channels for creating a MAC protocol data unit (PDU). In NR wireless communication systems, there is a need for providing a method for logical channel selection to properly differentiate the radio resource usage between the eMBB and the URLLC services.

SUMMARY

The present disclosure is directed to the procedure of logical channel selection for the next generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to perform following actions: Receive, from a base station, a block error rate (BLER) related restriction for each of a plurality of configured logical channels. Receive, from the base station, an uplink (UL) grant. Obtain a BLER related characteristic of the UL grant. Select, among the plurality of configured logical channels, one or more logical channels for the UL grant, according to the BLER related characteristic of the UL grant and the BLER related restriction for each of the plurality of configured logical channels when a first condition is met. Allocate the UL grant to the selected one or more logical channels.

According to another aspect of the present disclosure, a method of logical channel selection performed by a user equipment (UE) is provided. The method comprises: receiving, from a base station, a block error rate (BLER) related restriction for each of a plurality of configured logical channels; receiving, from the base station, an uplink (UL) grant; obtaining a BLER related characteristic of the UL grant; selecting, among the plurality of configured logical channels, one or more logical channels for the UL grant, according to the BLER related characteristic of the UL grant and the BLER related restriction for each of the plurality of configured logical channels when a first condition is met; and allocating the UL grant to the selected one or more logical channels.

BRIEF DESCRIPTION OF THE DRAWINGS

Aspects of the example disclosure are best understood from the following detailed description when read with the accompanying figures. Various features are not drawn to scale, dimensions of various features may be arbitrarily increased or reduced for clarity of discussion.

FIG. 4 shows one format of a logical channel configuration, according to an example implementation of the present application.

FIG. 5 shows a process of logical channel selection performed by a MAC entity, according to an example implementation of the present application.

FIG. 6 shows a process of logical channel selection performed by a MAC entity in Case #1-a, according to an example implementation of the present application.

FIG. 7 shows a process of logical channel selection performed by a MAC entity in Case #1-b, according to an example implementation of the present application.

FIG. 8 shows a process of logical channel selection performed by a MAC entity in Case #1-c, according to an example implementation of the present application.

FIG. 9 shows a process of logical channel selection performed by a MAC entity in Case #1-c, according to an example implementation of the present application.

FIG. 10 shows a process of logical channel selection performed by a MAC entity in Case #1-d, according to an example implementation of the present application.

FIG. 11 shows a process of logical channel selection performed by a MAC entity in Case #1-e, according to an example implementation of the present application.

FIG. 12 shows a process of logical channel selection performed by a MAC entity in Case #1-e, according to an example implementation of the present application.

FIG. 13 shows a process of logical channel selection performed by a MAC entity in Case #1-f, according to an example implementation of the present application.

FIG. 14 shows a process of logical channel selection performed by a MAC entity in Case #2-a, according to an example implementation of the present application.

FIG. 15 shows a process of logical channel selection performed by a MAC entity in Case #2-b, according to an example implementation of the present application.

DETAILED DESCRIPTION

Figure 1:
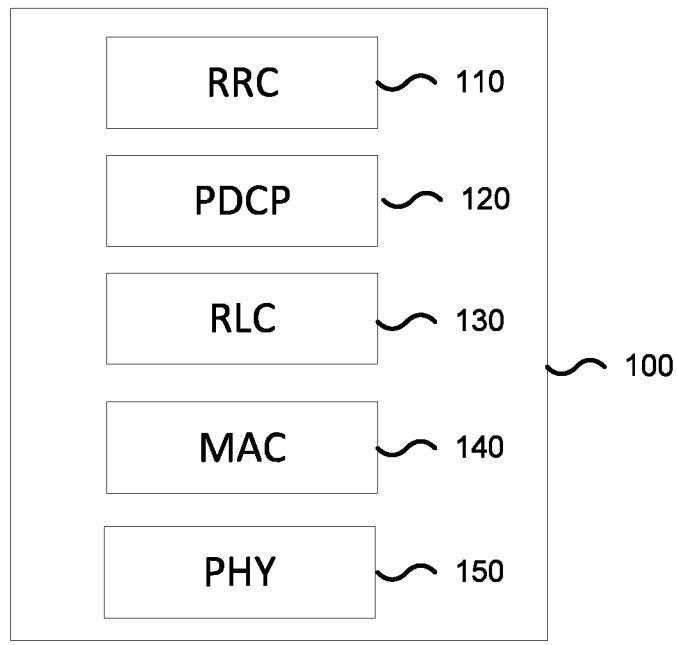
FIG. 1 is a diagram illustrating a protocol stack of a UE, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a personal digital assistant (PDA) with wireless communication capability. The UE is configured to receive and transmit signals over an air interface to one or more cells in a radio access network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), New Radio (NR, often referred to as 5G), and/or LTE-A Pro. However, the scope of the present application should not be limited to the above mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services or V2X services.

FIG. 1 is a diagram illustrating a protocol stack of a UE, according to an example implementation of the present application. The protocol stack in the UE 100 may include a radio resource control (RRC) layer 110, a packet data convergence protocol (PDCP) layer 120, a radio link control (RLC) layer 130, a medium access control (MAC) layer 140, and a physical (PHY) layer 150. The functions of the RRC layer 110 may include: broadcast of system information, establishment and release of an RRC connection between the UE 100 and a network (e.g. next generation radio access network, NG-RAN), Quality of Service (QoS) management functions, etc. The functions of the PDCP layer 120 may include: ciphering, deciphering, integrity protection, duplication of PDCP PDUs, etc. The functions of the RLC layer 130 may include segmentation of RLC service data units (SDUs), reassembly of SDU, RLC re-establishment, etc. The functions of the MAC layer 140 may include mapping between logical channels and transport channels, multiplexing of MAC SDUs belonging to one ore different logical channels into transport blocks (TB) delivered to the PHY layer 150 on transport channels, priority handling between logical channels of the UE 100 by means of logical channel prioritization, etc. The functions of the PHY layer 150 may include carrier modulation, channel coding, initial access, beam management, etc.

Figure 2:
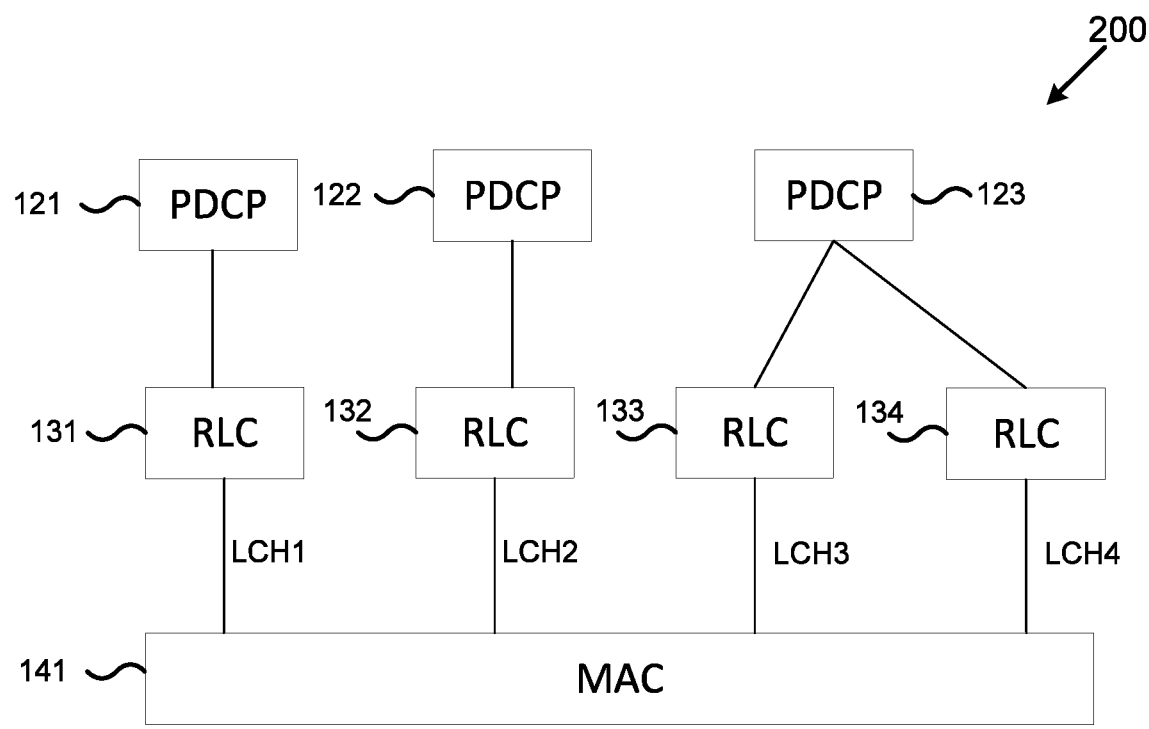
FIG. 2 is a diagram illustrating multiple logical channels associated with a MAC entity, according to an example implementation of the present application.

FIG. 2 is a diagram illustrating multiple logical channels associated with a MAC entity, according to an example implementation of the present application. FIG. 2 focuses on the MAC layer 140, RLC layer 130, and PDCP layer 120 shown in FIG. 1. The architecture 200 in the UE 100 may be configured by a base station (e.g., gNB). The MAC layer 140 offers to the to the RLC layer 130 logical channels. In general, a single MAC entity is configured to the UE 100. When the UE 100 is configured with a secondary cell group (SCG), two MAC entities may be configured to the UE 100: one for the master cell group (MCG) and one for the SCG. As shown in FIG. 2, a MAC entity 141 may be associated with multiple logical channels LCH1, LCH2, LCH3, LCH4, which are corresponding to multiple RLC entities 131, 132, 133, 134, respectively. During the procedure of logic channel selection, the MAC entity 141 may select one or more logic channels among the logical channels LCH1, LCH2, LCH3, LCH4, and then allocate an uplink grant to the selected one or more logical channels.

In the example shown in FIG. 2, the UE 100 is configured with the architecture 200 that supports PDCP duplication function. In one implementation, some of the logical channels may be associated to a radio bearer configured with the PDCP duplication function, and some of the logical channels may be associated to another radio bearer that is not configured with the PDCP duplication function. As shown in FIG. 2, logical channels LCH1 and LCH2 are not associated to the PDCP duplication function, and logical channels LCH3 and LCH4 are associated to the PDCP duplication function.

In one implementation, the PDCP duplication function may be activated or deactivated dynamically. Therefore, for a radio bearer that is not associated with the PDCP duplication function (such as the radio bearer of the PDCP entity 121 or the PDCP entity 122), possible scenarios may include: (a) the radio bearer is not configured with the PDCP duplication function, (b) the radio bearer is configured with the PDCP duplication function but the PDCP duplication function is deactivated, (c) the radio bearer was configured with the PDCP duplication function before but now the PDCP duplication function is removed. For a radio bearer that is associated with the PDCP entity 123 which is configured with PDCP duplication function, two RLC entities 133 and 134 may handle the duplicated PDCP PDUs for the radio bearer associated with the PDCP entity 123. The PDCP duplication function may be configured for a radio bearer by RRC. With two transmission paths, the PDCP duplication function may increase reliability and thus is beneficial for URLLC services.

The URLLC service has high reliability requirement on its data transmission. In contrast, the eMBB service cares more on its data rate improvement. In order to achieve the high reliability requirement for the URLLC service, NR's physical layer may provide a new radio resource that has lower target BLER (e.g., $10^{-5}$) than the original type (e.g., $10^{-1}$). With two different types of radio resource, a UE may be granted or scheduled with radio resource dynamically if the UE subscribes both URLLC and eMBB services. How the UE allocates the radio resource granted by the gNB between URLLC and eMBB services remains an issue. In fact, the eMBB service can be satisfied with normal BLER level radio resource, but the URLLC service cannot. Hence, when a low BLER radio resource data is granted from the gNB, the MAC layer in the UE may prioritize the low BLER radio resource to be adopted by a logical channel (LCH) that serves the URLLC service rather than a logical channel that serves the eMBB service. Because the low and normal BLER levels of radio resource are granted dynamically by the gNB, there is a need for providing an enhanced MAC procedure within the UE, especially a logical channel prioritization (LCP) procedure, to achieve more efficient operation. The LCP procedure will be discussed in detail in the following description.

In one implementation, a method of logical channel selection performed by a UE may include the following actions. The UE may receive, from a base station, a BLER related restriction for each of a plurality of configured logical channels. The UE may receive, from the base station, an uplink (UL) grant. The UE may obtain a BLER related characteristic of the UL grant. The UE may select, among the plurality of configured logical channels, one or more logical channels for the UL grant, according to the BLER related characteristic of the UL grant and the BLER related restriction for each of the plurality of configured logical channels. The UE may allocate the UL grant to the selected one or more logical channels.

Figure 3:
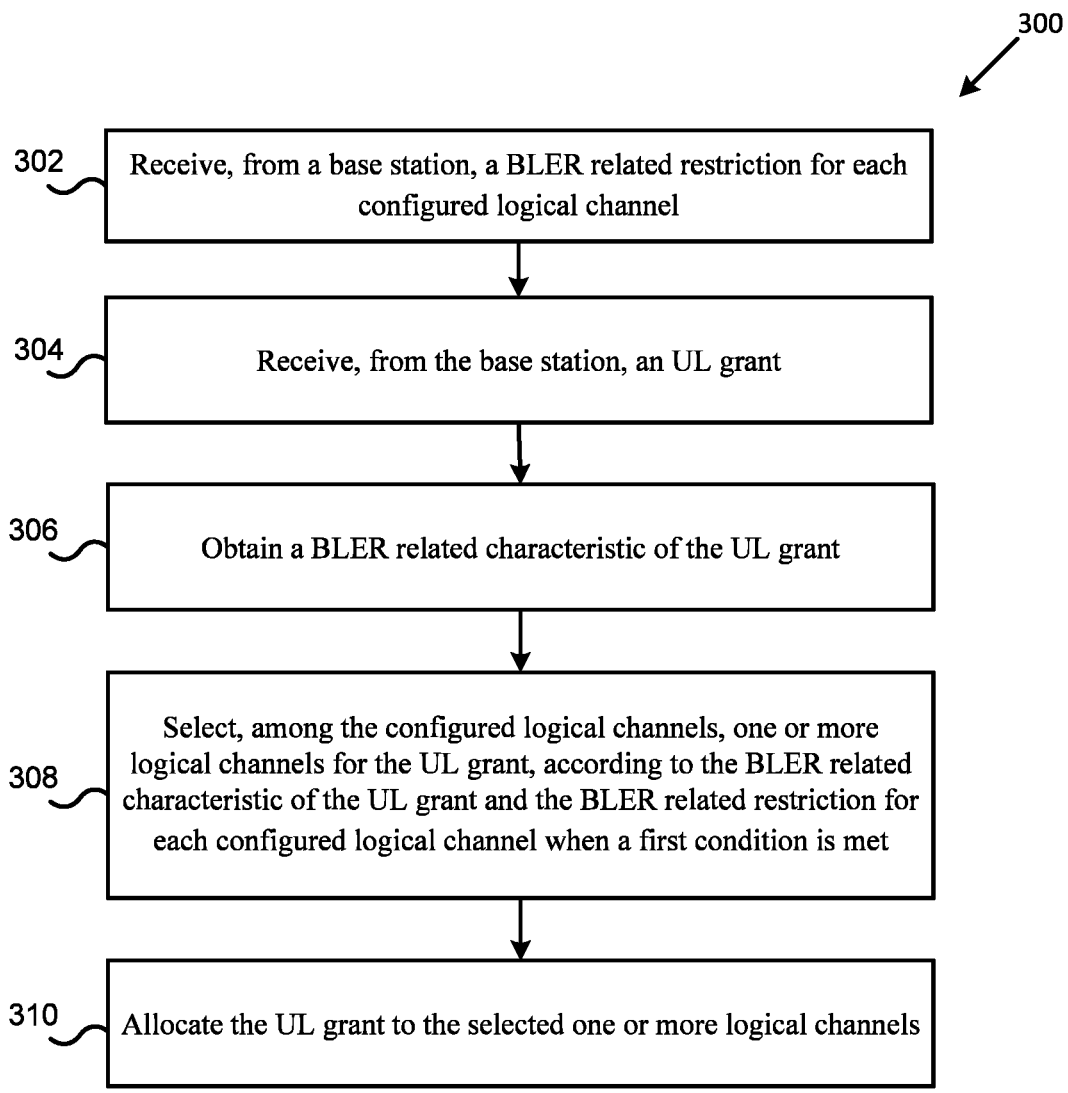
FIG. 3 is a flowchart for a method of logical channel selection performed by a UE, according to an example implementation of the present application.

FIG. 3 is a flowchart for a method of logical channel selection performed by a UE, according to an example implementation of the present application. The method 300 may include actions 302, 304, 306, 308, and 310. In action 302, the UE may receive, from a base station, a BLER related restriction for each of a plurality of configured logical channels. In action 304, the UE may receive, from the base station, an uplink (UL) grant. In action 306, the UE may obtain a BLER related characteristic of the UL grant. In action 308, the UE may select, among the plurality of configured logical channels, one or more logical channels for the UL grant, according to the BLER related characteristic of the UL grant and the BLER related restriction for each of the plurality of configured logical channels when a first condition is met. In action 310, the UE may allocate the UL grant to the selected one or more logical channels. It should be noted that the base station in this disclosure may be eNB, ng-eNB, gNB, or other apparatus capable of controlling radio communication and managing radio resources within a cell. In the following, the base station may also be denoted as gNB for simplification. It should also be noted that the NR gNB or the cell mentioned in the disclosure may be applied to any base station, regardless the radio access technologies.

The UL grant in action 304 may be received on a Physical Downlink Control Channel (PDCCH). Once a new transmission is performed (e.g., an UL grant is received), the UE may obtain the BLER related characteristic of the UL grant in action 306. In one implementation, the action 306 may include: the MAC entity of the UE obtains a BLER characteristic of the UL grant from the physical layer of the UE. The BLER characteristic may indicate a BLER level of the UL grant. The BLER characteristic may be an exact BLER value, a BLER level index, or a pre-categorized BLER level.

In one implementation, the MAC entity may be notified, by the physical layer, the target BLER of the UL grant (e.g., radio resource). The BLER notification from the physical layer to the MAC entity may be a BLER level based on pre-categorized BLER levels (e.g., normal or low) or an exact value of the BLER (e.g., $10^{-1}$, $10^{-5}$ . . . etc.). In one implementation, the target BLER of the UL grant may be indicated by a specific Radio Network Temporary Identifier (RNTI). In one implementation, the target BLER may be categorized into multiple levels by the gNB. A corresponding BLER mapping table may be provided from the gNB to the UE via a downlink RRC message (e.g., RRCReconfiguration, RRCResume, RRCReestablishment, RRCSetup or any other downlink unicast RRC message). An example of a BLER mapping table is shown in Table 1 below.

TABLE 1

Example of a BLER mapping table

| BLER level index | BLER value |
|---|---|
| 00 | $10^{-1}$ |
| 01 | $10^{-5}$ |
| 10 | $10^{-7}$ |
| 11 | Reserved |

Based on the BLER mapping table, the physical layer may simply provide an BLER level index to the MAC entity for indicating the BLER of the UL grant. The MAC entity may figure out the BLER by receiving the BLER level index and referring to the BLER mapping table. In one implementation, the physical layer may not provide the BLER characteristic (e.g., the BLER level index) to the MAC entity. In other words, the physical layer may optionally provide the BLER characteristic to the MAC entity for each UL grant. When the MAC entity does not successfully obtain the BLER characteristic of the UL grant from the physical layer, the MAC entity may set a predetermined value to the BLER level of the UL grant. The predetermined value may be a default BLER level (e.g., predetermined or preconfigured by the gNB), a normal or a specific BLER level (e.g., predetermined or preconfigured by the gNB), or a BLER level of a previous UL grant. In one implementation, if the BLER characteristic (e.g., the BLER level index) is not provided from the physical layer to the MAC entity, the MAC entity may ignore the BLER matter within the LCP procedure for this UL grant.

The BLER related restriction in action 302 may be within a logical channel configuration provided by the gNB to the UE. In one implementation, the BLER related restriction may be within a downlink (DL) RRC message (e.g. RRCReconfiguration, RRCResume, RRCReestablishment, RRCSetup or any other downlink unicast RRC message) sent from the base station. FIG. 4 shows one format of a logical channel configuration, according to an example implementation of the present application. Abstract Syntax Notation One (ASN.1) may be used to describe the data structure of various implementations of a message in the present application. As shown in FIG. 4, a data structure 400 of the logical channel configuration may include parameters related to the LCP procedure, including priority, prioritisedBitRate, bucketSizeDuration, and BLER_restriction of each logical channel.

After the BLER_restriction for each LCH is configured by the gNB (e.g., action 302 in FIG. 3), the UE may consider the configured BLER_restriction during the procedure of logical channel selection. After the MAC entity is indicated, by the physical layer, the BLER of the UL grant for a new transmission (e.g., action 306 in FIG. 3), the MAC may select one or more logical channels for each UL grant that satisfy BLER related restriction during the selection of logical channels stage within the LCP procedure (e.g., action 308 in FIG. 3).

The BLER related restriction may be explicitly or implicitly configured by the gNB. In one implementation, when the gNB configures each logical channel to the UE, the gNB may explicitly indicate a BLER related restriction (e.g., BLER_restriction shown in FIG. 4) via a specific information element (IE) within a specific downlink RRC message (e.g., a LogicalChannelConfig IE within the RRCReconfiguration, RRCResume, RRCReestablishment, RRCSetup or any other downlink unicast RRC message).

FIG. 5 shows a process of logical channel selection performed by a MAC entity, according to an example implementation of the present application. According to method 500 shown in FIG. 5, the MAC entity may select a logical channel that satisfies various conditions including BLER_restriction and other factors such as subcarrier spacing, allowed serving cells, and so on. For example, the MAC entity may select an LCH if the LCH's corresponding BLER_restriction satisfies a specific condition. There are several alternatives regarding the BLER_restriction shown in FIG. 4 and the specific condition shown in FIG. 5.

Case #1-a: Allowed Highest BLER Level

The BLER_restriction shown in FIG. 4 may be a threshold of the highest BLER that is allowed by an LCH. In Case #1-a, the BLER_restriction may be renamed as Allowed_Highest_BLER. For example, if the LCH is restricted to only adopt the UL grant whose BLER is not higher than $10^{-5}$ (e.g., only $10^{-5}$ and $10^{-7}$ may be allowed), the BLER_restriction shown in FIG. 4 may be:

Allowed_Highest_BLER $10^{-5}$

In one implementation, the gNB may indicate the threshold through a BLER level index (e.g., the index shown in Table 1) instead. The BLER_restriction shown in FIG. 4 may be:

Allowed_Highest_BLER 01

FIG. 6 shows a process of logical channel selection performed by a MAC entity in Case #1-a, according to an example implementation of the present application. During the selection of logical channels procedure shown in FIG. 5, the MAC entity may select an LCH if the LCH's corresponding configured Allowed_Highest_BLER satisfies a specific condition. According to the method 600 shown in FIG. 6, the specific condition may be: Allowed_Highest_BLER is not lower than the BLER level of the UL grant.

It should be noted that the method shown in FIG. 6 is corresponding to the method shown in FIG. 5. The omitted part ( . . . ) in FIG. 6 may be corresponding to the conditions: allowed Subcarrier Spacing index values, maxPUSCH-duration, configuredGrantType1Allowed, and allowedServingCells shown in FIG. 5. Allowed_Highest_BLER in FIG. 6 nay be corresponding to BLER_restriction in FIG. 5. Similar representation is also used in FIG. 7-FIG. 15.

Case #1-b: Allowed Lowest BLER Level

The BLER_restriction shown in FIG. 4 may be a threshold of the lowest BLER that is allowed by an LCH. In Case #1-b, the BLER_restriction may be renamed as Allowed_Lowest_BLER. For example, if the LCH is restricted to only adopt the UL grant whose BLER is not lower than $10^{-5}$ (e.g., only $10^{-1}$ and $10^{-5}$ may be allowed), the BLER_ restriction shown in FIG. 4 may be:

Allowed_Lowest_BLER $10^{-5}$

In one implementation, the gNB may indicate the threshold through a BLER level index (e.g., the index shown in Table 1) instead. The BLER_restriction shown in FIG. 4 may be:

Allowed_Lowest_BLER 01

FIG. 7 shows a process of logical channel selection performed by a MAC entity in Case #1-b, according to an example implementation of the present application. During the selection of logical channels procedure shown in FIG. 5, the MAC entity may select an LCH if the LCH's corresponding configured Allowed_Lowest_BLER satisfies a specific condition. According to the method 700 shown in FIG. 7, the specific condition may be: Allowed_Lowest_BLER is not higher than the BLER level of the UL grant.

Case #1-c: Allowed BLER Level List

The BLER_restriction shown in FIG. 4 may be a list of the BLER levels that is allowed by an LCH. In Case #1-c, the BLER_restriction may be renamed as Allowed_BLER_List. For example, if the LCH is restricted to only adopt the UL grant whose BLER is $10^{-1}$ or $10^{-5}$, the BLER_restriction shown in FIG. 4 may be:

Allowed_BLER_List $\{10^{-1}, 10^{-5}\}$

In one implementation, the gNB may indicate the list through a BLER level index (e.g., the index shown in Table 1) instead. The BLER_restriction shown in FIG. 4 may be:

Allowed_BLER_List $\{00, 01\}$

FIG. 8 shows a process of logical channel selection performed by a MAC entity in Case #1-c, according to an example implementation of the present application. During the selection of logical channels procedure shown in FIG. 5, the MAC entity may select an LCH if the LCH's corresponding configured Allowed_BLER_List satisfies a specific condition. According to the method 800 shown in FIG. 8, the specific condition may be: the set of BLER values in Allowed_BLER_List includes the BLER level of the UL grant.

In one implementation, the list may be indicated through a BLER level index. The corresponding method for logical channel selection may be referred to FIG. 9, which shows a process of logical channel selection performed by a MAC entity in Case #1-c, according to an example implementation of the present application. During the selection of logical channels procedure shown in FIG. 5, the MAC entity may select an LCH if the LCH's corresponding configured Allowed_BLER_List satisfies a specific condition. According to the method 900 shown in FIG. 9, the specific condition may be: the set of BLER level indexes in Allowed_BLER_List includes the BLER level of the UL grant.

Case #1-d: Allowed Specific BLER Level

The BLER_restriction shown in FIG. 4 may be a single BLER level that is allowed by an LCH. In Case #1-d, the BLER_restriction may be renamed as Allowed_Specific_BLER. For example, if the LCH is restricted to only adopt the UL grant whose BLER is $10^{-5}$, the BLER_restriction shown in FIG. 4 may be:

Allowed_Specific_BLER $10^{-5}$

In one implementation, the gNB may indicate the specific BLER level through a BLER level index (e.g., the index shown in Table 1) instead. The BLER_restriction shown in FIG. 4 may be:

Allowed_Specific_BLER 01

In one implementation, the Allowed_Specific_BLER may be used to indicate whether the LCH is allowed to adopt the UL grant whose BLER level is a pre-configured value (e.g., default value). The default value may be preconfigured by the gNB, and the default value may be UE specific, cell group specific, cell specific, carrier specific (e.g., normal uplink (NUL) or supplementary uplink (SUL)), or bandwidth part (BWP) specific.

FIG. 10 shows a process of logical channel selection performed by a MAC entity in Case #1-d, according to an example implementation of the present application. During the selection of logical channels procedure shown in FIG. 5, the MAC entity may select an LCH if the LCH's corresponding configured Allowed_Specific_BLER satisfies a specific condition. According to the method 1000 shown in FIG. 10, the specific condition may be: Allowed_Specific_BLER matches the BLER level of the UL grant.

Case #1-e: Prohibited BLER Level List

The BLER_restriction shown in FIG. 4 may be a list of the BLER levels that is not allowed by an LCH. In Case #1-e, the BLER_restriction may be renamed as Prohibit_BLER_List. For example, if the LCH is prohibited to adopt the UL grant whose BLER is $10^{-1}$ or $10^{-5}$, the BLER_restriction shown in FIG. 4 may be:

Prohibit_BLER_List $\{10^{-1}, 10^{-5}\}$

In one implementation, the gNB may indicate the list through a BLER level index (e.g., the index shown in Table 1) instead. The BLER_restriction shown in FIG. 4 may be:

Prohibit_BLER_List {00, 01}

FIG. 11 shows a process of logical channel selection performed by a MAC entity in Case #1-e, according to an example implementation of the present application. During the selection of logical channels procedure shown in FIG. 5, the MAC entity may select an LCH if the LCH's corresponding configured Prohibit_BLER_List satisfies a specific condition. According to the method 1100 shown in FIG. 11, the specific condition may be: the set of BLER values in Prohibit_BLER_List does not include the BLER level of the UL grant.

In one implementation, the list may be indicated through a BLER level index. The corresponding method for logical channel selection may be referred to FIG. 12, which shows a process of logical channel selection performed by a MAC entity in Case #1-e, according to an example implementation of the present application. During the selection of logical channels procedure shown in FIG. 5, the MAC entity may select an LCH if the LCH's corresponding configured Prohibit_BLER_List satisfies a specific condition. According to the method 1200 shown in FIG. 12, the specific condition may be: the set of BLER level indexes in Prohibit_BLER_List does not include the BLER level of the UL grant.

Case #1-f: Prohibited Specific BLER Level

The BLER_restriction shown in FIG. 4 may be a single BLER level that is not allowed by an LCH. In Case #1-f, the BLER_restriction may be renamed as Prohibit_Specific_BLER. For example, if the LCH is prohibited to adopt the UL grant whose BLER is $10^{-5}$, the BLER_restriction shown in FIG. 4 may be:

Prohibit_Specific_BLER $10^{-5}$

In one implementation, the gNB may indicate the specific BLER level through a BLER level index (e.g., the index shown in Table 1) instead. The BLER_restriction shown in FIG. 4 may be:

Prohibit_Specific_BLER 01

In one implementation, the Prohibit_Specific_BLER may be used to indicate whether the LCH is not allowed to adopt the UL grant whose BLER level is a pre-configured value (e.g., default value). The default value may be preconfigured by the gNB, and the default value may be UE specific, cell group specific, cell specific, carrier specific (e.g., normal uplink (NUL) or supplementary uplink (SUL)), or bandwidth part (BWP) specific.

FIG. 13 shows a process of logical channel selection performed by a MAC entity in Case #1-f, according to an example implementation of the present application. During the selection of logical channels procedure shown in FIG. 5, the MAC entity may select an LCH if the LCH's corresponding configured Prohibit_Specific_BLER satisfies a specific condition. According to the method 1300 shown in FIG. 13, the specific condition may be: Prohibit_Specific_BLER does not match the BLER level of the UL grant.

Case #1-g: Multiple BLER Mapping Tables

In one implementation, in addition to Table 1 shown above, the gNB may configure the UE with another BLER mapping table. Table 1 may be called the first BLER mapping table, and the additional configured BLER mapping table may be called the second BLER mapping table. In one implementation, the mapping between the BLER level index and the BLER value within the second BLER mapping table may be: one BLER level index maps to multiple BLER values or a range of BLER values. In one implementation, the BLER value in the second BLER mapping table may directly represent a threshold of acceptable highest or lowest BLER value.

In one implementation, the first BLER mapping table may be used when the physical layer indicates the BLER level of each granted UL grant to the MAC entity (e.g., action 306 shown in FIG. 3). On the other hand, the second BLER mapping table may be used when the gNB configures each logical channel to the UE (e.g., the logical channel configuration shown in FIG. 4, action 302 shown in FIG. 3). As such, a BLER level index may represent a BLER related restriction, as described in case #1-a through case #1-f.

Case #1-h: BLER Related Restriction Indicated by Bandwidth Part

In one implementation, the BLER related restriction for each of the configured logical channels may be a list of bandwidth parts (BWPs). The Allowed BLER level list, Allowed Specific BLER, Prohibit BLER level list and Prohibit Specific BLER in case #1-c through case #1-f may be replaced by Allowed BWP list, Allowed Specific BWP, Prohibit BWP list and Prohibit Specific BWP, respectively. The gNB may control the BLER level specific UL grant adopted by specific LCH by indicating a BWP related LCP restriction (e.g., BLER_restriction IE shown in FIG. 4) via a specific IE within a specific downlink RRC message (e.g., a LogicalChannelConfig IE within the RRCReconfiguration, RRCResume, RRCReestablishment, RRCSetup or any other downlink unicast RRC message). The BLER level specific UL grant may be granted by the gNB only in a specific BWP. The BLER related characteristic of the UL grant may include a first BWP indication indicating which BWP the UL grant is in. In case #1-h, there may be an implicit mapping relation between a BWP and a BLER level. By using the BWP to configure the BLER related restriction of each logical channel and indicating which BWP the UL grant is in, the LCP procedure effectively takes the BLER related restriction into consideration.

Case #1-i: BLER Related Restriction Indicated by Carrier

In one implementation, the BLER related restriction for each of the configured logical channels may be a list of carriers. The Allowed BLER level list, Allowed Specific BLER, Prohibit BLER level list and Prohibit Specific BLER in case #1-c through case #1-f may be replaced by Allowed carrier list, Allowed Specific carrier, Prohibit carrier list and Prohibit Specific carrier, respectively. The gNB may control the BLER level specific UL grant adopted by specific LCH by indicating a carrier related LCP restriction (e.g., BLER_restriction IE shown in FIG. 4) via a specific IE within a specific downlink RRC message (e.g., a LogicalChannelConfig IE within the RRCReconfiguration, RRCResume, RRCReestablishment, RRCSetup or any other downlink unicast RRC message). The BLER level specific UL grant may be granted by the gNB only in a specific carrier. The BLER related characteristic of the UL grant may include a first carrier which the UE grant uses. In case #1-i, there may be an implicit mapping relation between a carrier and a BLER level. By using the carrier to configure the BLER related restriction of each logical channel and indicating which carrier the UL grant uses, the LCP procedure effectively takes the BLER related restriction into consideration.

In one implementation, when the gNB configures each logical channel to the UE, the gNB may not explicitly indicate a BLER related LCP restriction (e.g., BLER_restriction IE shown in FIG. 4) via a specific IE within a specific downlink RRC message (e.g., a LogicalChannelConfig IE within the RRCReconfiguration, RRCResume, RRCReestablishment, RRCSetup or any other downlink unicast RRC message). Instead, the gNB may implicitly configure the UE to prohibit a specific BLER level of an UL grant to be adopted by a specific LCH. Several alternatives of implicit LCP restriction are described below.

Case #2-a: Logical Channels Associated with a PDCP Duplication Function

In one implementation, only the logical channel(s) associated to the PDCP duplication function may apply a specific BLER level UL grant. In other words, during the procedure of logical channel selection, a set of candidate logical channels may be identified first, and the selected one or more logical channels may be selected from the set of candidate logical channels. The set of candidate logical channels may be associated to a radio bearer configured with a PDCP duplication function.

FIG. 14 shows a process of logical channel selection performed by a MAC entity in Case #2-a, according to an example implementation of the present application. When the UE is granted by the gNB with a specific BLER level of UL grant, during the selection of logical channels procedure shown in FIG. 5, the MAC entity may select an LCH if the LCH satisfies a specific condition. According to the method 1400 shown in FIG. 14, the specific condition may be: the logical channel of the DRB which is configured with the PDCP duplication function.

An example of Case #2-a may be referred to the architecture 200 shown in FIG. 2. In one scenario, logical channels LCH1 and LCH2 are not associated to the PDCP duplication function, and the logical channels LCH3 and LCH4 are associated to the PDCP duplication function. As such, the set of candidate logical channels in Case #2-a may include the logical channels LCH3 and LCH4, but not the logical channels LCH1 and LCH2. In action 308 shown in FIG. 3, the UE may select one or more logical channels from the logical channels LCH3 and LCH4.

Case #2-b: Logical Channels Associated with a PDCP Duplication Function, and the PDCP Duplication Function is Activated In one implementation, only when a logical channel is associated to the PDCP duplication function and the PDCP duplication function is activated, the logical channel may apply a specific BLER level UL grant. In other words, during the procedure of logical channel selection, a set of candidate logical channels may be identified first, and the selected one or more logical channels may be selected from the set of candidate logical channels. The set of candidate logical channels may be associated to a radio bearer configured with a PDCP duplication function, and the PDCP duplication function is activated for the set of candidate logical channels.

FIG. 15 shows a process of logical channel selection performed by a MAC entity in Case #2-b, according to an example implementation of the present application. When the UE is granted by the gNB with a specific BLER level of UL grant, during the selection of logical channels procedure shown in FIG. 5, the MAC entity may select an LCH if the LCH satisfies a specific condition. According to the method 1500 shown in FIG. 15, the specific condition may be: the logical channel of the DRB which is configured with the PDCP duplication function, and the PDCP duplication function is activated.

Refer to the method 500 shown in FIG. 5, there may be several factors to be considered for logical channel selection. In one embodiment, the BLER related restriction may be optionally enabled/disabled in certain conditions. For example, the method 500 may take the BLER_restriction into consideration under specific conditions, and the method 500 may ignore the BLER_restriction under other specific conditions. Refer to the method 300 shown in FIG. 3, in action 308, selection of one or more logical channels may consider the BLER related restriction when a first conditions is met. Several alternatives of the first condition in action 308 are described below.

Case #3-a: The first condition may be met (e.g, the UE enables the LCP restriction for a logical channel introduced in case #1-a through case #1-i) when the plurality of configured logical channels are associated to a radio bearer configured with a PDCP duplication function.

Case #3-b: The first condition may be met (e.g, the UE enables the LCP restriction for a logical channel introduced in case #1-a through case #1-i) when the plurality of configured logical channels are associated to a radio bearer configured with a PDCP duplication function, and the PDCP duplication function is activated.

Case #3-c: In one implementation, the first condition may be met (e.g, the UE enables the LCP restriction for a logical channel introduced in case #1-a through case #1-i) when the UE is connected to the base station by using a supplementary uplink carrier (SUL). That is, the current connected UL carrier is a SUL. In another implementation, the first condition may be met when the current connected UL carrier is not a SUL. SUL may be configured to improve UL coverage for high frequency scenarios. With SUL, the UE may be configured with two ULs for one DL of the same cell.

Case #3-d: The first condition may be met (e.g, the UE enables the LCP restriction for a logical channel introduced in case #1-a through case #1-i) when a specific cell or a specific BWP is configured and/or activated by the gNB.

Case #3-e: The gNB may configure multiple sets of LCP restriction parameters to the UE. Each set of LCP restriction may be applied in a specific situation. For example, the UE may be configured with a set of LCP restriction parameters which includes the BLER related restriction as introduced in case #1-a through case #1-i, and another set of LCP restriction parameters which does not include the BLER related restriction as introduced in case #1-a through case #1-i. The UE may apply the first set of LCP restriction parameter in at least one of the following conditions: current connected UL carrier is not a SUL, current connected UL carrier is a SUL, a specific cell is configured, a specific BWP is configured and/or activated by the gNB. The UE may apply the second set of LCP restriction otherwise.

Case #3-f: The LCP restriction introduced in case #1-a through case #1-i for a logical channel may be disabled (e.g., the method 500 in FIG. 5 may ignore the BLER_restriction) when the logical channel of a data radio bearer (DRB) was configured with PDCP duplication function but now the PDCP duplication function is removed (e.g, the PDCP duplication function is currently not configured by the gNB).

Case #3-g: The LCP restriction introduced in case #1-a through case #1-i for a logical channel may be disabled (e.g., the method 500 in FIG. 5 may ignore the BLER_restriction) when the logical channel of a DRB was configured with PDCP duplication function and the status of the PDCP duplication function changed from activated to deactivated.

Case #3-h: In one implementation, the UE may enable the LCP restriction for a logical channel introduced in case #1-a through case #1-i. However, the UE may automatically disable one or more specific configured LCP restriction parameters. The specific LCP restriction parameter may include, but not limited to, the following: allowedSCS-List which sets the allowed Subcarrier Spacing(s) for transmission, maxPUSCH-Duration which sets the maximum PUSCH duration allowed for transmission, configuredGrantType1Allowed which sets whether a Configured Grant Type 1 can be used for transmission, allowedServingCells which sets the allowed cell(s) for transmission.

Case #3-i: When any one of case #3-a through case #3-h happens, the MAC entity may apply another specific set or subset of the ul-SpecificParameters, including for example, priority where an increasing priority value indicates a lower priority level, prioritisedBitRate which sets the Prioritized Bit Rate (PBR), bucketSizeDuration which sets the Bucket Size Duration (BSD).

Case #3-j: The first condition may be met (e.g, the UE enables the LCP restriction for a logical channel introduced in case #1-a through case #1-i) when a specific secondary eNB, secondary gNB, secondary transceiver node, or secondary cell group is configured. The UE may be in a dual connectivity (DC) mode in case #3-j. In one implementation, the first condition may be met when the UE is configured with a first MAC entity and a second MAC entity. The first MAC entity may be for a master cell group (MCG) and the second MAC entity may be for a secondary cell group (SCG).

The various alternatives introduced in case #1, case #2, case #3 may also be logically combined and applied by the UE simultaneously.

For a grant based URLLC data transmission, the gNB may apply new RRC parameter(s) for configuring a URLLC specific RNTI. The gNB may also increase the options of an RRC IE "MCS-table" to indicate the MCS table for URLLC data transmission. Since the reliability requirement for URLLC and eMBB is different, the MCS table applied for the URLLC data transmission and for the eMBB data transmission may be different. The gNB may need to indicate at least two independent MCS tables to the UE if the UE simultaneously supports both the eMBB and URLLC data transmission. One MCS table may be for the eMBB and the other MCS table may be for the URLLC data transmission. A specific RNTI configured for URLLC data transmission may be called U-RNTI, which may also be referred to as MCS-C-RNTI in the followwing description. Several MAC related procedures within the UE's MAC entity dealing with the dynamic radio resource granting from the gNB are described below.

Case #4-a: Downlink Shared Channel (DL-SCH) Data Transfer

Downlink assignments received on the PDCCH both indicate that there is a transmission on a DL-SCH for a particular MAC entity and provide the relevant hybrid automatic repeat request (HARQ) information. If the UE is configured with the MCS-C-RNTI by the gNB, the UE may apply the following procedure for the DL-SCH data transfer procedure within its MAC entity.

When the MAC entity has a C-RNTI, MCS-C-RNTI, Temporary C-RNTI, or CS-RNTI, the MAC entity may for each PDCCH occasion during which it monitors PDCCH and for each Serving Cell:

1> if a downlink assignment for this PDCCH occasion and this Serving Cell has been received on the PDCCH for the MAC entity's C-RNTI, MCS-C-RNTI, or Temporary C-RNTI:
  2> if this is the first downlink assignment for this Temporary C-RNTI:
    3> consider the NDI to have been toggled.
  2> if the downlink assignment is for the MAC entity's C-RNTI or MCS-C-RNTI, and if the previous downlink assignment indicated to the HARQ entity of the same HARQ process was either a downlink assignment received for the MAC entity's CS-RNTI or a configured downlink assignment:
    3> consider the NDI to have been toggled regardless of the value of the NDI.
  2> indicate the presence of a downlink assignment and deliver the associated HARQ information to the HARQ entity.

Case #4-b: Uplink Shared Channel (UL-SCH) Data Transfer

Uplink grant may be either received dynamically on the PDCCH, in a Random Access Response, or configured semi-persistently by RRC. The MAC entity may have an uplink grant to transmit on the UL-SCH. To perform the requested transmissions, the MAC layer receives HARQ information from lower layers. If the UE is configured with the MCS-C-RNTI by the gNB, the UE may apply the following procedure for the UL-SCH data transfer procedure within its MAC entity.

If the MAC entity has a C-RNTI, MCS-C-RNTI, a Temporary C-RNTI, or CS-RNTI, the MAC entity may for each PDCCH occasion and for each Serving Cell belonging to a TAG that has a running timeAlignmentTimer and for each grant received for this PDCCH occasion:

1> if an uplink grant for this Serving Cell has been received on the PDCCH for the MAC entity's C-RNTI, MCS-C-RNTI or Temporary C-RNTI; or
1> if an uplink grant has been received in a Random Access Response:
  2> if the uplink grant is for MAC entity's C-RNTI or MCS-C-RNTI and if the previous uplink grant delivered to the HARQ entity for the same HARQ process was either an uplink grant received for the MAC entity's CS-RNTI or a configured uplink grant:
    3> consider the NDI to have been toggled for the corresponding HARQ process regardless of the value of the NDI.
  2> if the uplink grant is for MAC entity's C-RNTI or MCS-C-RNTI, and the identified HARQ process is configured for a configured uplink grant:
    3> start or restart the configuredGrantTimer for the corresponding HARQ process, if configured.
  2> deliver the uplink grant and the associated HARQ information to the HARQ entity.

Case #4-c: Discontinuous Reception (DRX)

If the UE is configured with the MCS-C-RNTI by the gNB, the UE may apply the following procedure for the DRX procedure within its MAC entity.

The MAC entity may be configured by RRC with a DRX functionality that controls the UE's PDCCH monitoring activity for the MAC entity's C-RNTI, MCS-C-RNTI, CS-RNTI, INT-RNTI, SFI-RNTI, SP-CSI-RNTI, TPC-PUCCH-RNTI, TPC-PUSCH-RNTI, and TPC-SRS-RNTI. When in RRC_CONNECTED, if DRX is configured, the MAC entity may monitor the PDCCH discontinuously using the DRX operation; otherwise the MAC entity may monitor the PDCCH continuously.

Case #4-d: Bandwidth Part (BWP) Operation

If the MAC entity receives a PDCCH for BWP switching for a Serving Cell while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion in which case the UE may perform BWP switching to a BWP indicated by the PDCCH. Upon reception of the PDCCH for BWP switching other than successful contention resolution, if the MAC entity decides to perform BWP switching, the MAC entity may stop the ongoing Random Access procedure and initiate a Random Access procedure on the new activated BWP; if the MAC decides to ignore the PDCCH for BWP switching, the MAC entity may continue with the ongoing Random Access procedure on the active BWP. If the UE is configured with the MCS-C-RNTI by the gNB, the UE may apply the following procedure for the BWP operation within its MAC entity.

If the bwp-InactivityTimer is configured, the MAC entity may for each activated Serving Cell:
1> if the defaultDownlinkBWP is configured, and the active DL BWP is not the BWP indicated by the defaultDownlinkBWP; or
1> if the defaultDownlinkBWP is not configured, and the active DL BWP is not the initialDownlinkBWP:
  2> if a PDCCH addressed to C-RNTI, MCS-C-RNTI or CS-RNTI indicating downlink assignment or uplink grant is received on the active BWP; or
  2> if a PDCCH addressed to C-RNTI, MCS-C-RNTI or CS-RNTI indicating downlink assignment or uplink grant is received for the active BWP; or
  2> if a MAC PDU is transmitted in a configured uplink grant or received in a configured downlink assignment:
    3> if there is no ongoing random access procedure associated with this Serving Cell; or
    3> if the ongoing random access procedure associated with this Serving Cell is successfully completed upon reception of this PDCCH addressed to C-RNTI or MCS-C-RNTI:
      4> start or restart the bwp-InactivityTimer associated with the active DL BWP.

Figure 16:
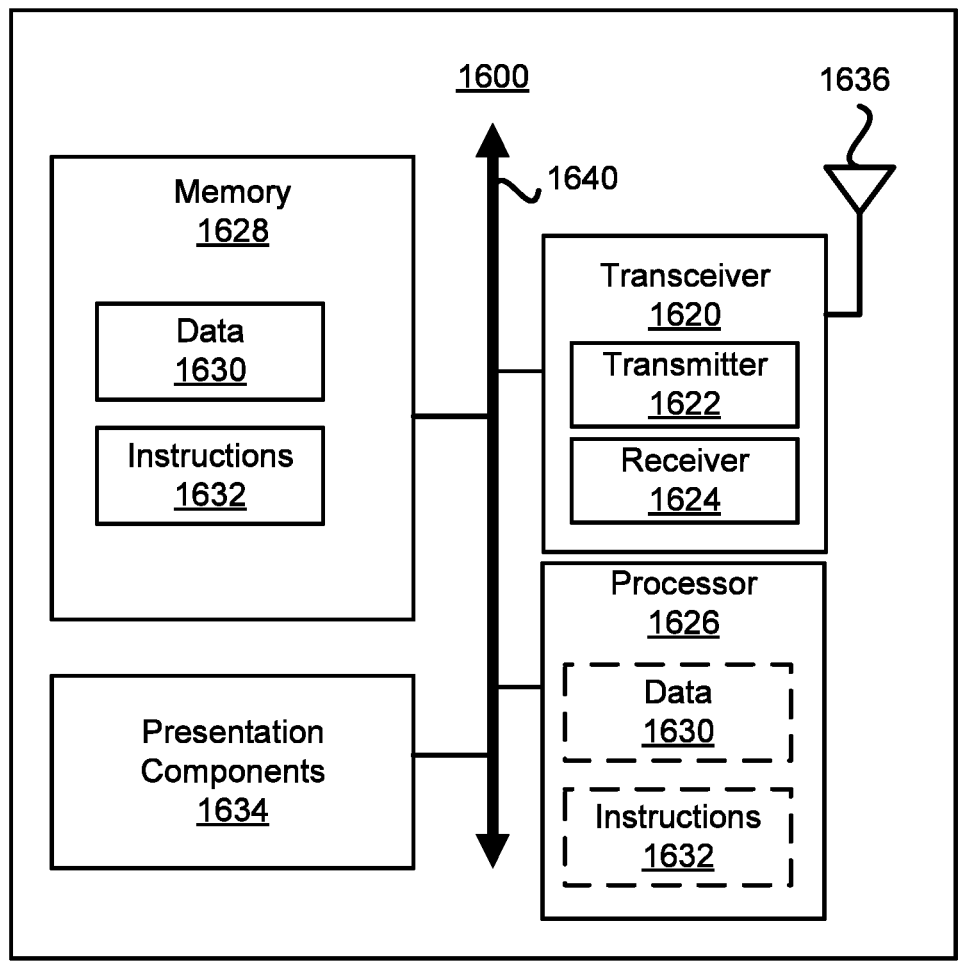
FIG. 16 illustrates a block diagram of a device for wireless communication, in accordance with various aspects of the present application.

FIG. 16 illustrates a block diagram of a device for wireless communication, in accordance with various aspects of the present application. As shown in FIG. 16, device 1600 may include transceiver 1620, processor 1626, memory 1628, one or more presentation components 1634, and at least one antenna 1636. Device 1600 may also include a Radio Frequency (RF) spectrum band module, a base station communications module, a network communications module, and a system communications management module, input/output (I/O) ports, I/O components, and power supply (not explicitly shown in FIG. 16). Each of these components may be in communication with each other, directly or indirectly, over one or more buses 1640.

Transceiver 1620 having transmitter 1622 and receiver 1624 may be configured to transmit and/or receive time and/or frequency resource partitioning information. In some implementations, transceiver 1620 may be configured to transmit in different types of subframes and slots including, but not limited to, usable, non-usable and flexibly usable subframes and slot formats. Transceiver 1620 may be configured to receive data and control channels.

Device 1600 may include a variety of computer-readable media. Computer-readable media can be any available media that can be accessed by device 1600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1628 may include computer-storage media in the form of volatile and/or non-volatile memory. Memory 1628 may be removable, non-removable, or a combination thereof. Example memory includes solid-state memory, hard drives, optical-disc drives, and etc. As illustrated in FIG. 16, memory 1628 may store computer-readable, computer-executable instructions 1632 (e.g., software codes) that are configured to, when executed, cause processor 1626 to perform various functions described herein, for example, with reference to FIGS. 1 through 15. Alternatively, instructions 1632 may not be directly executable by processor 1626 but be configured to cause device 1600 (e.g., when compiled and executed) to perform various functions described herein.

Processor 1626 may include an intelligent hardware device, e.g., a central processing unit (CPU), a microcontroller, an ASIC, and etc. Processor 1626 may include memory. Processor 1626 may process data 1630 and instructions 1632 received from memory 1628, and information through transceiver 1620, the base band communications module, and/or the network communications module. Processor 1626 may also process information to be sent to transceiver 1620 for transmission through antenna 1636, to the network communications module for transmission to a core network.

One or more presentation components 1634 presents data indications to a person or other device. Exemplary one or more presentation components 1634 include a display device, speaker, printing component, vibrating component, and etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE), comprising:
one or more non-transitory computer-readable media having computer-executable instructions embodied thereon; and
at least one processor coupled to the one or more non-transitory computer-readable media, and configured to execute the computer-executable instructions to:
receive, from a base station, a block error rate (BLER) related restriction for each of a plurality of configured logical channels;
receive, from the base station, an uplink (UL) grant;
obtain a BLER related characteristic of the UL grant;
select, among the plurality of configured logical channels, one or more logical channels for the UL grant, according to the BLER related characteristic of the UL grant and the BLER related restriction for each of the plurality of configured logical channels when a first condition is met; and
allocate the UL grant to the selected one or more logical channels;
wherein the BLER related restriction for each of the plurality of configured logical channels is a list of prohibited BLER levels.

2. The UE of claim 1, wherein the BLER related restriction for each of the plurality of configured logical channels is within a downlink (DL) radio resource control (RRC) message received from the base station.

3. The UE of claim 1, wherein the at least one processor is further configured to execute the computer-executable instructions to:
obtain, by a medium access control (MAC) entity of the UE, a BLER characteristic from a physical (PHY) layer of the UE, wherein the BLER characteristic indicates a BLER level of the UL grant.

4. The UE of claim 3, wherein the at least one processor is further configured to execute the computer-executable instructions to:
set, by the MAC entity of the UE, the BLER level of the UL grant to a predetermined value when the MAC entity of the UE does not successfully obtain the BLER characteristic from the PHY layer of the UE.

5. The UE of claim 1, wherein the BLER related restriction for each of the plurality of configured logical channels is a BLER threshold.

6. The UE of claim 1, wherein the BLER related restriction for each of the plurality of configured logical channels is a list of BLER levels.

7. The UE of claim 1, wherein:
the BLER related restriction for each of the plurality of configured logical channels is a list of bandwidth parts (BWPs); and
the BLER related characteristic of the UL grant comprises a first BWP indication indicating which BWP the UL grant is in.

8. The UE of claim 1, wherein:
the BLER related restriction for each of the plurality of configured logical channels is a list of carriers; and
the BLER related characteristic of the UL grant comprises a first carrier which the UL grant uses.

9. The UE of claim 1, wherein the at least one processor is further configured to execute the computer-executable instructions to:
identify a set of candidate logical channels among the plurality of configured logical channels, wherein the set of candidate logical channels is associated to a radio bearer configured with a packet data convergence protocol (PDCP) duplication function;
wherein the selected one or more logical channels are selected from the set of candidate logical channels.

10. The UE of claim 9, wherein the PDCP duplication function is activated for the set of candidate logical channels.

11. The UE of claim 1, wherein the first condition is met when the plurality of configured logical channels are associated to a radio bearer configured with a packet data convergence protocol (PDCP) duplication function.

12. The UE of claim 1, wherein the first condition is met when the UE is connected to the base station by using a supplementary uplink carrier.

13. The UE of claim 1, wherein the first condition is met when a specific cell or a specific bandwidth part (BWP) is configured by the base station.

14. The UE of claim 1, wherein:
the first condition is met when the UE is configured with a first medium access control (MAC) entity and a second MAC entity;
the first MAC entity is for a master cell group (MCG); and
the second MAC entity is for a secondary cell group (SCG).

15. A method of logical channel selection performed by a user equipment (UE), the method comprising:
receiving, from a base station, a block error rate (BLER) related restriction for each of a plurality of configured logical channels;
receiving, from the base station, an uplink (UL) grant;
obtaining a BLER related characteristic of the UL grant;
selecting, among the plurality of configured logical channels, one or more logical channels for the UL grant, according to the BLER related characteristic of the UL grant and the BLER related restriction for each of the plurality of configured logical channels when a first condition is met; and
allocating the UL grant to the selected one or more logical channels;
wherein the BLER related restriction for each of the plurality of configured logical channels is a list of prohibited BLER levels.

16. The method of claim 15, wherein the BLER related restriction for each of the plurality of configured logical channels is within a downlink (DL) radio resource control (RRC) message received from the base station.

17. The method of claim 15, wherein obtaining the BLER related characteristic of the UL grant comprises:
obtaining, by a medium access control (MAC) entity of the UE, a BLER characteristic from a physical (PHY) layer of the UE, wherein the BLER characteristic indicates a BLER level of the UL grant.

18. The method of claim 17, wherein obtaining the BLER level of the UL grant further comprises:
setting, by the MAC entity of the UE, the BLER level of the UL grant to a predetermined value when the MAC entity of the UE does not successfully obtain the BLER characteristic from the PHY layer of the UE.

19. The method of claim 15, wherein the BLER related restriction for each of the plurality of configured logical channels is a BLER threshold.

20. The method of claim 15, wherein the BLER related restriction for each of the plurality of configured logical channels is a list of BLER levels.

21. The method of claim 15, wherein:
the BLER related restriction for each of the plurality of configured logical channels is a list of bandwidth parts (BWPs); and
the BLER related characteristic of the UL grant comprises a first BWP indication indicating which BWP the UL grant is in.

22. The method of claim 15, wherein:
the BLER related restriction for each of the plurality of configured logical channels is a list of carriers; and
the BLER related characteristic of the UL grant comprises a first carrier which the UL grant uses.

23. The method of claim 15, further comprising:
identifying a set of candidate logical channels among the plurality of configured logical channels, wherein the set of candidate logical channels is associated to a radio bearer configured with a packet data convergence protocol (PDCP) duplication function;
wherein the selected one or more logical channels are selected from the set of candidate logical channels.

24. The method of claim 23, wherein the PDCP duplication function is activated for the set of candidate logical channels.

25. The method of claim 15, wherein the first condition is met when the plurality of configured logical channels are associated to a radio bearer configured with a packet data convergence protocol (PDCP) duplication function.

26. The method of claim 15, wherein the first condition is met when the UE is connected to the base station by using a supplementary uplink carrier.

27. The method of claim 15, wherein the first condition is met when a specific cell or a specific bandwidth part (BWP) is configured by the base station.

28. The method of claim 15, wherein:
the first condition is met when the UE is configured with a first medium access control (MAC) entity and a second MAC entity;
the first MAC entity is for a master cell group (MCG); and
the second MAC entity is for a secondary cell group (SCG).

* * * * *